United States Patent [19]

Platt

[11] 3,890,642

[45] June 17, 1975

[54] MAGNETIC TAPE TRANSPORT

[75] Inventor: John D. Platt, South Laguna, Calif.

[73] Assignee: MSI Data Corporation, Costa Mesa, Calif.

[22] Filed: May 2, 1973

[21] Appl. No.: 356,373

Related U.S. Application Data

[62] Division of Ser. No. 104,351, Jan. 6, 1971, Pat. No. 3,731,042.

[52] U.S. Cl. .................................. 360/96; 360/137

[51] Int. Cl. .......................................... G11b 15/00

[58] Field of Search ........ 274/4 C, 4 D; 360/74, 93, 360/96, 137

[56] References Cited

UNITED STATES PATENTS

| | | | |
|---|---|---|---|
| 3,573,392 | 4/1971 | Trammell | 360/74 |
| 3,609,844 | 10/1971 | Ichikawa | 274/4 C |
| 3,759,529 | 9/1973 | Yoshii | 274/4 C |

*Primary Examiner*—Vincent P. Canney
*Assistant Examiner*—Stewart Levy
*Attorney, Agent, or Firm*—Christie, Parker & Hale

[57] ABSTRACT

A tape transport assembly for a cassette tape cartridge adapted for releasably mounting the cartridge for a transducing operation. A pivotal headplate is mounted on the base member adjacent to a capstan and carries a pinch roller and a transducer to allow the pinch roller to engage the capstan with the tape for advancing the tape from reel to reel when the plate is swung towards the capstan to effect a transducing operation. A radius arm is pivoted to the transport assembly and pivotally carries the head plate. The radius arm may be automatically controlled for moving it into engagement with a resilient mounting means for the head plate to pivot the radius arm and thereby the head plate to allow a tape rewind operation.

2 Claims, 11 Drawing Figures

MAGNETIC TAPE TRANSPORT

CROSS REFERENCE TO RELATED APPLICATION

This application is a divisional application of my co-pending application bearing Ser. No. 104,351, filed Jan. 6, 1971, entitled Magnetic Tape Transport and assigned to the same assignee as the present application, now U.S. Pat. No. 3,751,042.

DESCRIPTION OF THE PRIOR ART AND THE PRESENT INVENTION

The present invention relates to a magnetic tape transport and more particularly to a tape transport for a cassette tape cartridge.

At the present time there is a demand for data terminals to be employed at data input sources for data computing systems. A large number of such data terminals are employed as remote data entry devices for gathering information, encoding it and subsequently transmitting the recorded information to a central computer which may be at a remote location. For certain applications it is important that such data gathering terminals be portable and lightweight and yet reliable and economical. A magnetic tape element that is becoming increasingly popular for data systems is a cassette magnetic tape cartridge that may be readily snapped into position onto a tape transport without physically handling the magnetic tape. These magnetic tape cartridges have been employed for digital recording applications as well as other conventional magnetic recording applications. There is a need, then, at the present time for a compact tape transport that will accommodate a cassette tape cartridge and allow it to be simply and inexpensively employed in a tape transport system that is portable and will reliably reproduce and record the information that is entered into the system.

The present invention provides a simple, more reliable and relatively inexpensive tape transport utilizing a cassette tape cartridge. The tape transport of the present invention provides a tape transporting arrangement that is highly reliable and compact wherein the individual elements of the system are defined to have multiple functions for as many elements as is practicable. The compactness of the transport system allows it to be implemented into a portable data gathering source.

From a structural standpoint, the invention comprehends an assembly for mounting a casette tape cartridge for effecting a transducing operation. The assembly includes a base member for mounting and demounting a cassette tape cartridge including coupling the rotatable reels carried by the cartridge to a pair of rotatable shafts. The cassette also receives a rotatable capstan which is mounted on the base member so as to engage one side of the tape. A head plate is mounted to the base member adjacent to the capstan for pivotal movement towards and away from the capstan. The head plate mounts at least a single transducer which may be a read/write head, when the tape is a magnetic tape, and a pinch roller in spaced-apart relationship thereon. The pinch roller is mounted on the head plate to rotatably engage the capstan with a tape therebetween to allow the tape to be advanced from one reel to the other and in this position of the head plate also allowing the transducer to be operative on the advancing tape. Means are also mounted on the base member for resiliently positioning the head plate for controlling the position of the head plate for effecting the transducing operations and for allowing the head plate to be moved in an angular relationship with respect to the cassette for rewinding the tape from one reel to the other without rendering the transducer operative. The control means for the head plate further includes means for allowing the head plate to be moved out of the path of the cassette to allow the cassette to be mounted and demounted to the base member.

The tape transport may also advantageously include a pair of rotatable drive shafts for positively coupling the tape reels to the cassette. The drive shafts advantageously include means operative upon rotation of the shafts to cause the correct positive coupling of reels and shafts to be effective in the event the cassette is not properly mounted relative to the shafts. A further feature of the tape transport assembly is the provision of a pivoted U-shaped backstop for slidably receiving and holding the cassette. The backstop is pivotable to allow the ready insertion of the cassette and movable into operative relationship with the elements mounted on the head plate for effecting the transducing operation through the mere pivoting of the backstop, the elements rendering the backstop pivotable having been reduced to a minimum.

These and other features of the present invention may be more fully appreciated when considered in light of the following specification and drawings, in which.

Figures 1, 2, 3, 4:
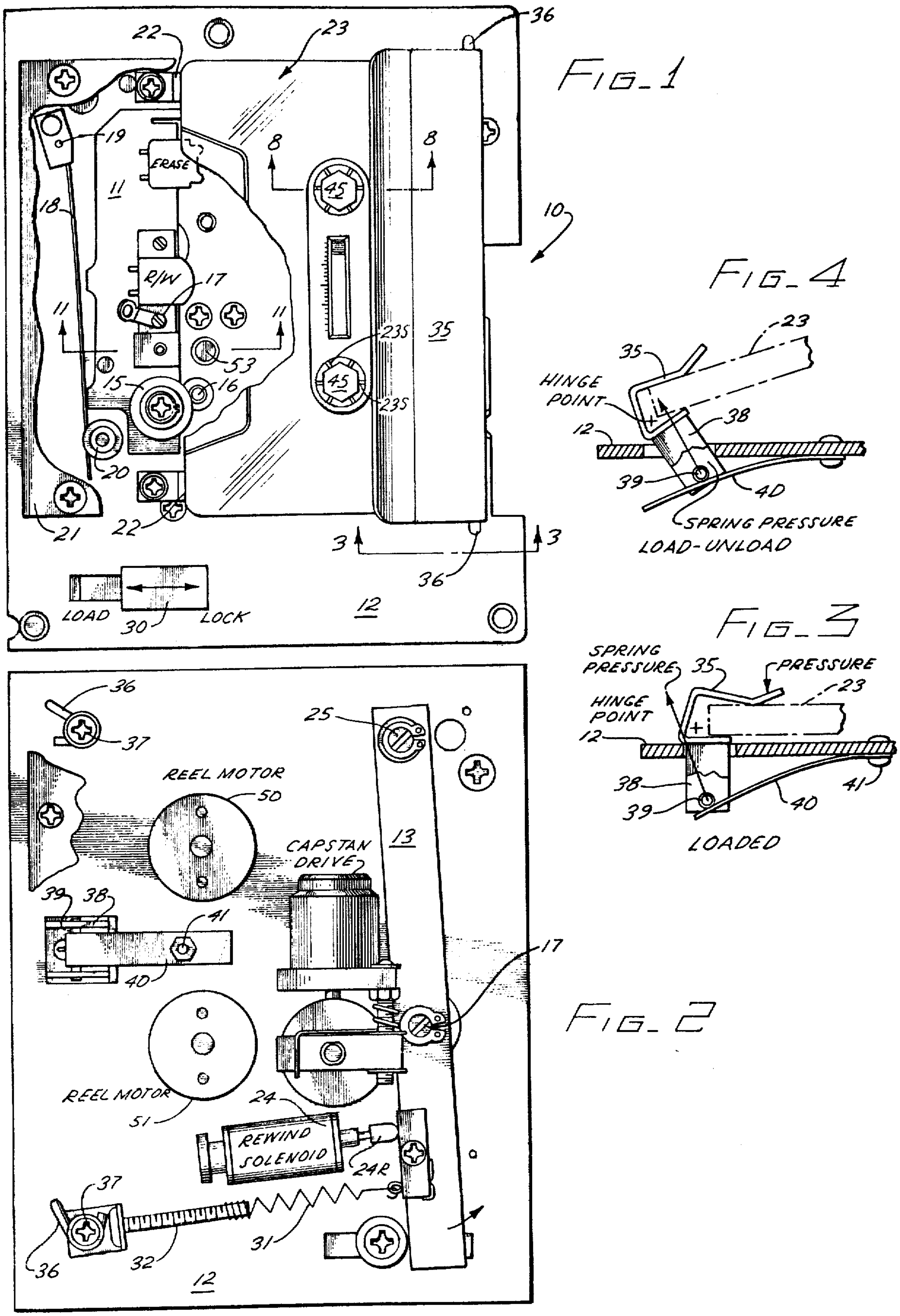
FIG. 1 is a top plan view of the tape transport assembly, illustrating certain elements broken away, and embodying the present invention.
FIG. 2 is a bottom plan view of the tape transport assembly illustrated in FIG. 1.
FIG. 3 is a sectional view taken along the lines 3—3 of FIG. 1 and illustrating the cassette in a loaded position.
FIG. 4 is a sectional view similar to FIG. 3 but illustrating the cassette holder in its alternate or load-unload position.

Now referring to the drawings, the invention will be described in detail. It should be recognized that the tape transport of the present invention is adapted for using a standard commercially available magnetic tape cartridge. A magnetic tape cartridge that is presently commercially available for digital recording of information houses a pair of tape reels with the tape extending between the reels of transporting tape between the two. The tape reels each have a central shaft receiving socket having a plurality of spaced apart splines extending inwardly for coupling to the drive shafts of the tape transport for rotating the reels. In addition, one edge of the cassette cartridge has a longitudinally extending opening for exposing the magnetic tape as it travels from one reel to the other. The cartridge also includes a pair of coaxial apertures arranged on opposite faces of the cartridge for receiving a capstan therein that is engageable with one side of the magnetic tape extending between the reels. The mounting sockets for the capstan are arranged in opposite ends of the longitudinal opening of the cassettes for effecting a transducing operation on both sides of the magnetic tape. Intermediate the two capstan drive units there is provided a pair of spaced apart mounting sockets that receive mounting studs carried by the base of the tape transport. It will be recognized that the above-described construction of the cassette per se forms no part of the present invention.

The tape transport system 10 of the present invention comprises a head plate 11 pivotally mounted to the base member 12 of the tape transport system and coacting with a radius arm 13 mounted on the opposite side of the mounting plate 12 from the head plate 11. The head plate 11 as illustrated mounts a transducer which is identified as a read/write transducer for either reading or writing on the magnetic tape and a magnetic erase head spaced on one side thereof. On the opposite side of the read/write head a pinch roller 15 is mounted for coacting with a rotatable capstan 16 extending upwardly from the base plate 12. The head plate 11 is pivotally mounted to the radius arm 13 by means of a fastener 17 extending through the base member 12 and secured to the radius member 13. The head plate 11 is adjustably and resiliently controlled by an elongated leaf spring 18. The leaf spring 18 is secured at one end by means of a mounting member 19 fixed to the base member 12. The opposite end of the leaf spring 18 abuts a stop member 20 located adjacent the pinch roller and the head plate 11. These elements are best appreciated in their proper relationship in FIG. 1 wherein the cover box 21 for the head plate 11 is partially broken away to expose them. Adjacent the opposite ends of the head plate 11 and secured to the base member 12 there are provided a pair of L-shaped stop members 22 for arresting and defining the lateral position of the cassette 23 on the base member 12. A conventional cassette 23 is best illustrated in FIG. 1 in its loaded position.

The position of the head plate 11 may be automatically controlled to allow a rewind operation or the transfer of tape from one reel the other reel through the provision of rewind control solenoid 24 mounted to the back side of the mounting plate 12. The rewind solenoid 24 has its plunger 24R normally arranged in engagement with arm 13 for moving it outwardly as viewed in FIG. 2 and thereby carrying and positioning the head plate 11. It should be recognized that since the head plate 11 is pivotally mounted to the radius arm 13 that the pivoting of the radius arm 13 about its pivot shown as the fastener 25 carries the head plate 11 therewith. The position of the radius arm 13 may also be manually controlled through the provision of a control knob 30 mounted to the top side of the plate 12. The control knob 30 bears on the radius arm 13 to allow it to be manually swung about its pivot 25. The positioning of the control knob 30 to the left is considered as the load and unload position for the cassette 23 and the positioning of the control knob 30 to the right happens when the cassette is in position for a transducing operation. The tape transport system further includes an extension spring 31 secured on the back side of the mounting plate 12. One end of the extension spring 31 is secured to the radius arm 13 while its opposite end is mounted with a machine screw 32 which is in turn secured to the base 12, as illustrated. This extension spring returns the radius arm 13 to its normal position after deenergization of the rewind solenoid 24, or after cassette is placed in normal position.

A cassette backstop for mounting the cassette 23 is best appreciated from examining FIGS. 1, 3 and 4. The backstop is a longitudinally extending U-shaped element 35 pivotally mounted to the base member 12 to allow the cassette 23 to be loaded and unloaded. The backstop 35 is secured to the base member 12 by means of a pair of hinges 36 secured between the member 35 and the plate 12 at its back side. The hinges 36 may be inexpensively manufactured from aluminum welding rods and formed manually for coupling to the fasteners 37 secured to the back of the plate 12 and to the ends of the backstop 35 to allow the backstop to be readily pivoted from one position to another. For this purpose the backstop 35 is arranged with a dependent U-shaped pivoting member 38 which mounts a roller 39 engageable with a leaf spring 40. The leaf spring 40 is cantilevered as a result of being secured to the mounting plate 12 by means of a fastener 41. The roller 39 is movable along the cantilevered leaf spring 40 in response to the pivoting action transmitted to the cassette backstop 35. The two positions of the backstop 35 can best be appreciated from examining FIGS. 3 and 4. These Figs. not only illustrate the position of the backstop 35 but the cassette 23 mounted thereon and also the relative position of the pivotable mounting means for the backstop 35. It should also be noted that the structure and configuration of the backstop 35, a slightly closed U, is such that when the cassette is in its loaded position as illustrated in FIG. 3, that pressure is exerted on the cassette to maintain it in position. The pressure exerted by the leaf spring 40 in the two positions of the backstop member 35 is illustrated by the spring pressure line in the drawing.

Figure 8:
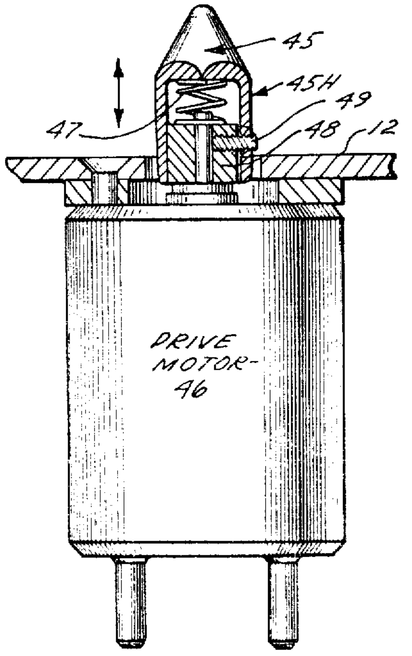
FIG. 8 is a cross-sectional view taken along the line 8—8 of FIG. 1.
Figures 9, 10:
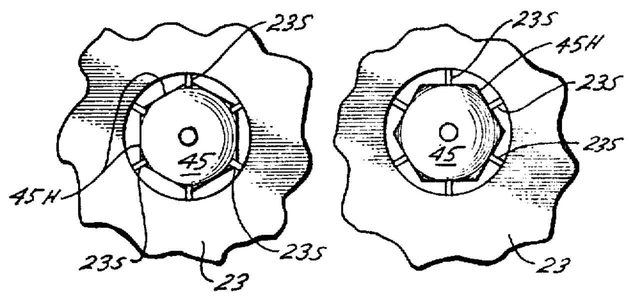
FIG. 9 is a partial top plan view illustrating the relationship between the drive shaft of FIG. 8 and the magnetic reels of the cassette when not properly coupled thereto.
FIG. 10 is a partial top plan view of the drive shafts and the reels of the cassette showing the correct coupling between the drive shaft and the cassette reel.

As mentioned hereinabove, the cassette 23 conventionally mounts a pair of tape storage reels for transferring the tape therebetween. The tape storage reels also conventionally include a plurality of spaced-apart splines 23S extending inwardly of the reel sockets for coupling to a drive shaft. An important feature of the present invention is the provision of collapsible drive shafts for mounting to the reel sockets in a positive relationship. For this purpose a typical reel drive shaft for the tape transport assembly of the present invention is illustrated in FIG. 8. The drive shaft 45 is illustrated with its free end defined in a conical configuration and a plurality of flats for engaging the splines 23S defined immediately below the conical section and around the outer periphery of the shaft 45. For this purpose this section of the drive shaft 45 may be defined as a hexagonal shape and the section is identified in the drawing as 45H. The drive shaft 45 is coupled to a reel drive motor 46 to be rotatable therewith. The drive motor 46 may be secured to the mounting plate 12 in any convenient fashion. The drive shaft 45 is illustrated as having a hollow interior and mounting a compression spring 47 mounted at one end thereof and positioned therein by means of a core 48. The core 48 is secured to the motor drive shaft proper by means of a set screw 49. The set screw 49 also drives the body rotationally at different vertical positions through the edge of the slot in the body for the shaft 45. The structure thus defined is adapted to cause the compression spring 47 to yield to the force resulting from mounting the cassette onto the shaft 45 at the reel drive and in the event that the shaft 45 is not positively coupled to the tape reels the construction of the shaft 45 will assure positive coupling upon rotation of the shaft 45. Stated differently, the shafts 45 are collapsible upon mounting the cassette 23 thereon to allow the splines 23S on the cassette reels to come into engagement with the hexagonal portion 45H of the shaft. The correct positive alignment of the cassette reels and the drive shaft 45 is illustrated in FIG. 10. Alternately, in the event that the cassette is not properly mounted to the shaft 45, when it is mounted to the conical portion of the shaft such as illustrated in FIG. 9, the energization of the drive motor 46 will cause the compression spring to be expanded and cause the shaft 45 to travel upwardly whereby the cassette reels will engage the hexagonal portion 45H of the shaft and be positively coupled thereto. The tape reels mounted in the cassette 23 are selectively actuated by means of conventional drive motors 50 and 51 mounted on the back side of the mounting plate 12, as best illustrated in FIG. 2.

Figure 11:
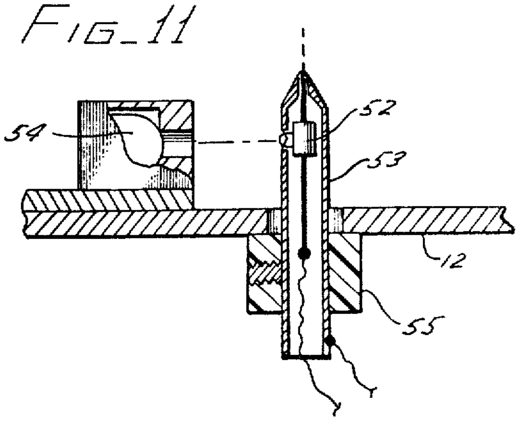
FIG. 11 is a sectional view taken along the line 11—11 of FIG. 1.

A further feature of the present invention is the provision of means for sensing the end of the tape on the reel and signalling this preselected segment of the tape. The conventional cassette 23 includes a transparent section of tape that may be placed at one end of the tape as a leader and a light-emitting diode 52 is mounted in a tubular housing 53 secured to the base member 12 through an electrically insulating member 55 for this purpose. The tubular member 53 housing the diode may also function as one of the conventional positioning members mounted on the base 12 for locating the cassette 23. For this purpose the end of the tubular member 53 is chamfered to guide the cassette 23 during the loading thereof; see FIG. 11. The light-emitting diode 52 is mounted opposite photo-electric sensor 54 for providing the electrical signal representative of the sensed transparent portion of the tape.

Figures 5, 6, 7:
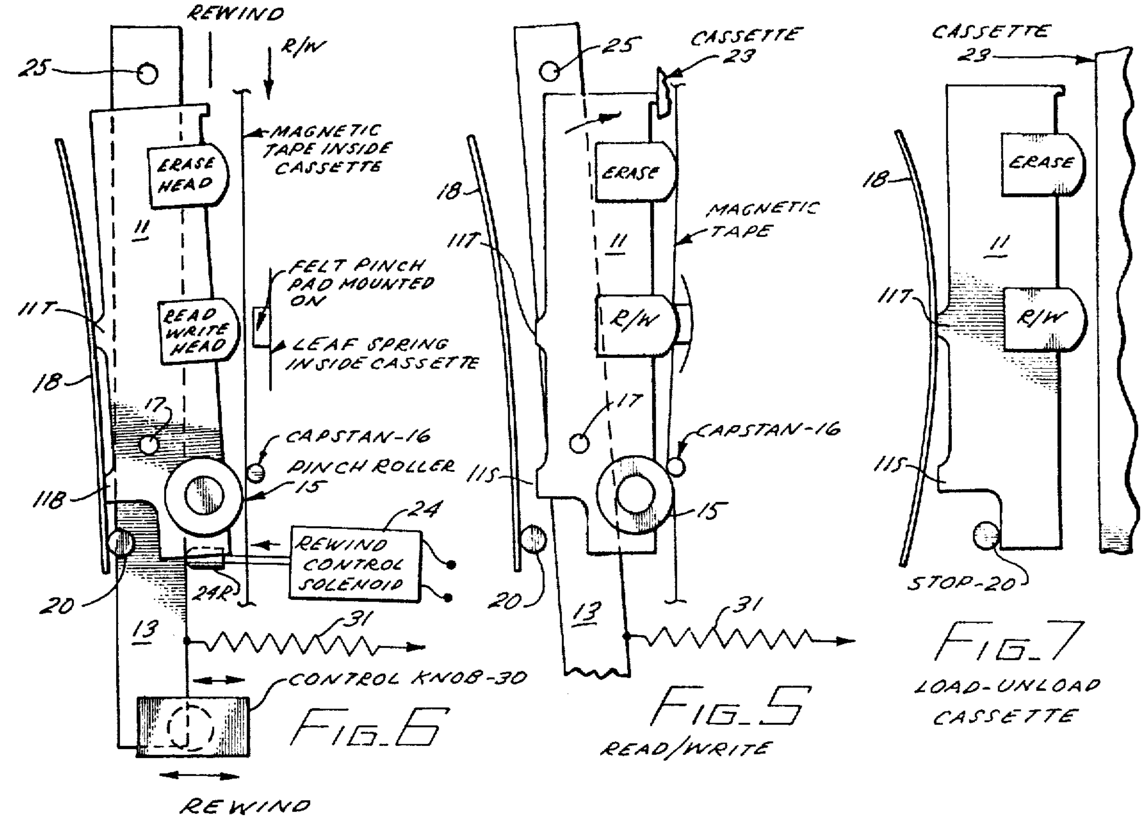
FIG. 5 is a diagrammatic representation of the head plate illustrating the position of the head plate with respect to the cassette for a transducing operation.
FIG. 6 is a diagrammatic representation of the head plate illustrating the relative position of the plate and the cassette during a rewind operation.
FIG. 7 is a diagrammatic representation of the head plate illustrating its position for loading and unloading the cassette.

With the above description of the structural organization of the tape transport system of the present invention in mind, the operation of the various elements can now be examined in detail. The magnetic tape cassette 23 is first mounted on the cassette backstop 35 when the back-up stop is pivoted to the load-unload position as illustrated in FIG. 4. In order to allow the cassette 23 to be swung down to operating position atop mainplate 12, the head plate 11 must be moved out of the path of the cassette to allow the mounting of the cassette 23 without interfering with the transducers on the head plate 11. For this purpose the control knob 30 is moved to the load position or to the left as illustrated in FIGS. 1 and 7. When the control knob 30 is moved to the left it rotates the radius arm 13 to the left until th head plate 11 deflects the reed spring 18 through engagement with the protrusions 11T and 11S of the head plate 11. The movement of the head plate 11 continues until the head plate engages the stop 20. With the cassette 23 mounted in the backstop 35, as illustrated in FIG. 4, it can be pivoted into operating, or the loaded position, by rotating the backstop 35 clockwise as illustrated in FIG. 3. This mounts the cassette 23 on the base 12 in the fashion illustrated in FIG. 1. Specifically, the capstan 16 mounts to the capstan socket on the cassette 23 and the positioning stud 53 mounts along with its companion positioning stud and receives and holds the cassette 23 in the proper alignment on the base member 12. It will also be appreciated that the cassette 23 is mounted adjacent the stops 21 and 22 to prevent the travel of the cassette cartridge 23 to the left as viewed in FIG. 1. With this mounting of the cassette 23 onto the tape transport the control knob 30 may be allowed to return to the locked position for holding the cassette securely to allow the transducing operation to take place. At this time, it will be recognized that the tape reels will be rotatably mounted to the drive shafts 45. The transducers may now be positioned for effecting the desired transducing operation. In this instance the reading of the information recorded on the magnetic tape is desired. For this purpose the head plate 11 is pivoted about the pivot point 17 towards the cassette 23. Stated differently, the head plate 11 is pivoted clockwise with respect to the pivot point 17 placing the capstan 10 and the pinch roller 15 into pressure contact and allowing the opposite end of the head plate 11 to swing towards the cassette 23 until the head plate 11 engages the cassette housing as illustrated in FIG. 5. This will place both the read/write transducer and the erase transducer in operational relationship with the magnetic tape inside the cassette 23. The desired transducing operation may be effected with the energization of the drive motor 46 and the capstan drive motor. For this purpose it will be recognized that the end of the tape signal may be provided through the provision of the light-emitting diode 52 and the detector 54. At this time, in the event that the cassette 23 is not properly mounted to the drive shaft 45, the energization of the drive motor 46 will cause the shaft 45 to move upwardly relative to the cassette under the urging of a compression spring 47 to positively couple the splines 23S to the portion 45H of the drive shafts 45.

If after the particular transducing operation is completed and it is desired to transfer the tape from the take-up spool back onto the supply spool, the rewind control solenoid 24 may be energized to cause the head plate 11 to be moved in a counter-clockwise direction with respect to the radius arm 13. The movement afforded by the operation of the control solenoid 24 to the head plate 11 is sufficient to move the transducers and the pinch roller out of operative relationship with the tape exposed thereto. The provision of the leaf spring 18 as the head plate positioning means allows the head plate to be positioned with a minimum amount of motion to allow a rewind operation to be automatically controlled through the operation of the rewind solenoid 24; see FIG. 6. Accordingly, with the energization of the drive motor for the supply reel the tape will be transferred back onto the supply reel without interfering with the head plate 11 for effecting any of the information recorded on the tape.

In reviewing the operation of the tape transport system, it will be noted that the only point that pressure is applied relative to the positioning of the transducers is at the capstan 16 and pinch roller 15, a point where the pressure is desired for advancing the tape.

It should now be apparent to those skilled in the art that the present invention had advanced the state of the art through the provision of an improved, simple relatively inexpensive and more reliable tape transport utilizing a tape cassette cartridge.

What is claimed is:

1. A tape transport assembly for a cassette tape cartridge comprising a base member including a pair of reel drive shafts for coupling to the reels of a cassette mounted thereon, said drive shafts each having portions for positively engaging the reels in a driving relationship when correctly coupled thereto and means operative upon rotation of the drive shafts for causing the correct and positive coupling of the reels and shafts to be effected, means mounted on the base member for releasably mounting a cassette tape cartridge having a pair of rotatable reels each mounting a plurality of spaced-apart reel driving elements for engaging the drive shafts and with tape extending between the reels and coupled to said reel drive shafts, a rotatable capstan mounted on the base member and extending therefrom so as to engage one side of the tape, means coupled to the capstan for rotatably driving same mounted on the opposite side of the base from the cassette mounting means, a head plate mounted on one side of the base member adjacent to the capstan and to allow movement toward and away from the capstan, said head plate mounting at least a single transducer and a pinch roller in spaced apart relationship to allow the pinch roller to rotatably engage the capstan with the tape therebetween, a radius arm pivotably mounted to the opposite side of the base member from the head plate and pivotably mounting the head plate, the head plate being pivotable with respect to the radius arm and movable therewith to allow the tape to be advanced from one reel to the other when the plate is swung towards the capstan and allowing the transducer to be operative on the advancing tape, means mounted on the base member for resiliently positioning the head plate relative to the base member and for urging it towards the cassette mounting means, control means mounted on the base member for moving the head plate toward the cassette to operatively position the transducer and pinch roller with respect to the tape and capstan, respectively, to allow a transducing operation on the tape; and for moving the head plate away from the pinch roller to allow the mounting and demounting of the tape cartridge on the base member;

said control means including automatic means for moving the radius arm to pivot the transducer and pinch roller on the head plate away from the tape and capstan respectively to a spaced position sufficient to allow the tape of the tape cartridge to be transferred from one reel to the other reel of the tape cartridge, and means for detecting a preselected segment of the tape cartridge and signalling the detection of same, the preselected segment consisting of a light transmitting section and said detection means comprising a light emitting diode mounted on the base member adjacent the head plate for sensing the tape leader and an photoelectric sensor mounted opposite the diode for receiving the light from the diode through the light transmitting section for providing an output signal from the sensor representative of the detection of the light transmitting section of the tape, and the means for mounting the light emitting diode functions as a positioning member for locating the cassette tape cartridge on the base member.

2. A tape transport assembly for a cassette type cartridge as defined in claim 1 wherein the means for positioning the head plate comprises a reed spring mounted to the transport mounting plate for adjustably mounting the head plate for allowing the head plate to be positioned with a minimum amount of motion for optimum clearance to allow the tape of the tape cartridge to be advanced without effecting a transducing operation and which reed spring can be overpowered for loading and unloading the cassette tape cartirdge.

* * * * *